May 12, 1931.  R. L. SKINNER  1,804,844
OIL RECTIFYING SYSTEM FOR INTERNAL COMBUSTION ENGINES
Original Filed March 22, 1928  2 Sheets-Sheet 2

Inventor
Ralph L. Skinner
By Walter M. Fuller
Atty.

Patented May 12, 1931

1,804,844

UNITED STATES PATENT OFFICE

RALPH L. SKINNER, OF DETROIT, MICHIGAN, ASSIGNOR, BY DIRECT AND MESNE ASSIGNMENTS, OF ONE ONE-HUNDREDTH TO SAID RALPH L. SKINNER AND NINETY-NINE ONE-HUNDREDTHS TO THOMAS H. WEST, OF WILMETTE, ILLINOIS

OIL-RECTIFYING SYSTEM FOR INTERNAL-COMBUSTION ENGINES

Application filed March 22, 1928, Serial No. 263,646. Renewed March 16, 1931.

My invention relates to appliances associated with internal-combustion engines, pumps or similar mechanisms for purifying the oil used for lubricating the engine or the like, whereby to free it from objectionable contaminating elements, more particularly volatile fuel liquids and water, the presence of either of which in the oil produces substantial, well-known, injurious results.

One aim of the invention is the provision of an appliance or apparatus of this character which will be effective on short runs of the automobile of which the engine forms its motive power, such a device being particularly needed on limited trips in cold climates.

On short, restricted operations of a car, the engine does not become thoroughly heated and hence condensation of the present, low-grade, gaseous fuel on the walls of the cylinders and intake passages occurs more readily with resulting greater dilution and pollution of the oil by the liquid fuel which escapes past the pistons into the oil supply in the engine crank-case.

Also, a substantial amount of water is formed in the crank-case under such circumstances, due to improper or ineffective oil seals around the piston-rings, with the result that more combustion gases are blown by the pistons into the crank-case, where they condense on the walls forming water, the presence of which is highly objectionable.

The same general principles of operation occur in cold climates and usually in greater degree, more or less regardless of the lengths of runs of the automobile, and also with heavy-duty engines using kerosene or distillate notwithstanding their known high operating engine temperatures.

To maintain the proper lubricating quality of the oil and to remove any water, so formed, from the oil, the heat of the engine, used for distillation or evaporation in the rectifier or dilution-eliminator, must be so employed as to heat the oil in the latter in a minimum amount of time when the engine is first started and yet not overheat it on long runs and at high speeds, which would cause the purifier to become carbonized and largely, if not wholly, inoperative.

Hence, an oil-rectifier or dilution-eliminator, to operate satisfactorily and efficiently, must have means for collecting the heat of the exhaust gases and for conducting it quickly to the oil-heating compartment of the device and with a minimum degree of heat loss.

Further, the oil undergoing refining treatment by such heat must be controlled in the heating chamber of the rectifier so that it will be rapidly brought to proper distilling temperature and then automatically governed so as not to be raised to excessive temperature under any running conditions of the engine.

In the new rectifier, the heat of the oil in such heating chamber is therefore governed or controlled by the amount of oil flowing through such chamber, a suitable thermostat being employed to regulate the rate of oil flow, so that, upon starting the engine, no oil is permitted entrance into the chamber until the oil therein has reached a suitable predetermined temperature, and, thereafter, the temperature of the oil therein is maintained within a relatively-narrow change range by the thermostatically-controlled amount of oil admitted into and permitted to flow through the chamber.

Heretofore, efforts have been made to accomplish the desired results, the impure oil being drawn from the engine crank-case or from the pressure lubricating-system of the engine which obtains its oil from the supply in the crank-case, but, in order to secure adequate heat on short engine runs, or in cold climates, the heating means has been made so large or efficient that, under high speeds or heavy loads, so much heat was conducted to the rectifying-chamber that excessive carbon formation resulted, rendering the device inoperative and also heating the oil in the lubrication-system of the engine to such an extent that its lubricating qualities were seriously impaired.

Some of the earlier appliances were subject to the objection that they attempted to heat too much oil at a time with the consequence that none of it was really heated hot enough for effective purifying purposes, except on long runs.

In the devices incorporating the present invention, a lesser quantity of oil is heated, the temperature of the oil in the heating compartment is maintained substantially constant, initial quick heating is insured with later restriction on the amount of heat delivered to the oil, the gases and vapors released or driven off from the oil undergoing treatment are immediately and constantly withdrawn, the oil reclamation occurs under such a small subatmospheric pressure as to allow the purified oil to return by gravity to the engine lubrication-system, the oil vapors from the crank-case are caused to flow through the rectifier precipitating their entrained oil which is heated with the other oil therein, the rectifier is always filled with the same amount of oil whereby there is no danger of carbonization by reason of the spreading of a thin film of oil over a highly-heated surface, and the thermostat used is of novel construction to obtain great power and substantial movement in a comparatively small space.

These and other novel structural and functional features of devices embodying the invention will become apparent to those skilled in this art from a consideration of a present preferred embodiment of the invention illustrated in detail in the accompanying drawings, forming a part of this specification and throughout the views of which like reference characters have been employed to designate the same parts.

Referring to these drawings, it will be observed that the novel and improved oil purifying or dilution-eliminating appliance includes a cast-metal member 11 providing an oil-rectifying chamber 12 within it, such element 11 having a base 13, screwed or otherwise attached at 14, 14 on the top of the exhaust-manifold 15 of an internal-combustion engine, not otherwise shown, with an appropriate heat-insulation gasket 16 interposed between the adjacent faces of the base and manifold, thus assuring that the hot exhaust gases flowing through the latter will not heat such member in substantial or objectionable degree, and, in addition, if desired, the outer surface of the chamber wall may be equipped with outstanding, cooling fins 17.

The top of chamber 12 is covered by a domed cap 18, fastened in place by screws 19, 19 or by any approved means, a copper, or other, appropriate, heat-conducting, gasket 21 being preferably used between the two, so that they will always be at about the same temperature, thus preventing condensation of vapors on the under surface of the cap.

Such top or cover 18 has a passage 22 through it, which, by means of a tube or pipe 23 is connected to the fuel-intake of the engine at either side of the throttle-valve of the carbureter, whereby a small degree of suction or vacuum is applied to the chamber for the removal or withdrawal of its gases and vapors which are consumed in the engine with resulting economy in its operation.

If such pipe 23 be joined directly to the engine intake-manifold, it should be of such calibre, or have a restriction of such size, that, with the admitted air and vapors specified hereinafter, a small degree of suction only is exerted in the chamber, thus not interfering with or preventing the gravity return of the reclaimed oil.

A pipe 24, connected to the pressure lubricating-oil line of the engine, is screwed into a small chamber 25 in the wall member 11, such cavity accommodating an oil screen or filter 26 of the convenient form, such recess being connected to an upright passage 27 in the wall equipped with a downwardly-closing, ball, check-valve 28, the ascent or rise of which is limited by a spring stop 29, so as not to allow the ball, under any circumstances, to rise and close the longitudinal passage 31 in a hollow screw 32 threaded into the upper end of chamber 27, cross apertures 33 in such screw communicating with a passage 34 in an upwardly inclined casting 35 held firmly in place in the appliance by the screw 32, with interposed washers 36, 36 between the head of the screw and the top face of the casting and between the lower surface of the latter and a supporting ledge 37 forming part of the casting 11.

One end of passage 34 is closed by a plug 38 and such passage, approximately at the middle of the appliance, is intersected by an inclined, threaded passage 39 having an intermediate shoulder 41. (See Figure 4.)

Figures 2, 3, 4:
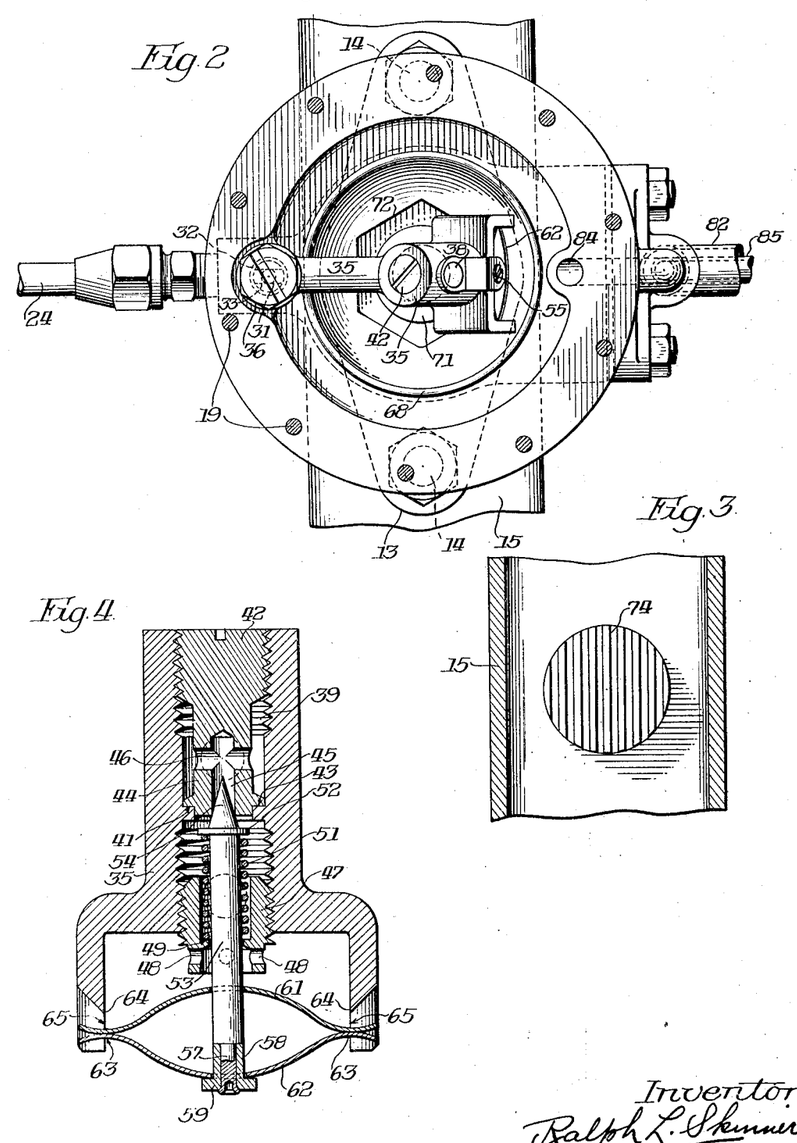
Figure 2 is a horizontal section on line 2—2 of Figure 1.
Figure 3 is a horizontal section through the engine exhaust-manifold on line 3—3 of Figure 1, the parts being viewed in the direction indicated by the arrows.
Figure 4 is an enlarged cross-section on line 4—4 of Figure 1, showing the oil-inlet valve construction.

A threaded plug 42 is screwed into the upper end of such passage 39 until an annular shoulder 43 on a reduced-diameter portion 44 of the plug bears against the fixed abutment 41, thus definitely determining its position.

Plug 42 has a central, cylindrical cavity 45, the mouth of which constitutes a valve-seat, and such chamber is intersected by a cross passage 46 in communication with the space 34.

A hollow plug 47 is screwed into the lower end of the passage 39, and, to facilitate such turning of the plug, it is equipped with a plurality of cross holes 48 on its exposed portion for the reception of a turning wrench or other suitable tool.

Internally, plug 47 has a circular shoulder 49 against which the lower end of a coiled spring 51 bears, its upper end pressing against an enlargement 52 on the stem 53 of a needle or conical valve 54 cooperating with the valve-seat of passage 45.

This spring is of such capacity or power that it will close the valve against an oil pressure in the cavity 45 considerably exceeding the maximum oil pressure actually existing in such compartment under the various operating conditions of the engine.

As is usual, spring 51 may be adjusted by turning the screw 47 which may be locked in position by a set-screw 55 and an interposed piece of soft metal 56 between the parts 55 and 47 to prevent injury to the threads of the latter. (See Figure 1.)

As is fully shown in Figure 4, the valve-stem 53 extends down through the plug 47, its reduced-diameter, end section 57 receiving a spool or sleeve 58 over it equipped with a flange or abutment 59, such element 58 being held to the valve-stem by heading over the exposed or protruding part of the latter.

Two, reversely-curved, bimetal, thermostatic strips 61 and 62 are centrally apertured to fit over the stem of the valve below plug 47 and the end sections of such strips are reversely curved at 63 to form frictionless bearing surfaces on one another at these points.

The adjacent portion of casting 35 is forked to form two, spaced, depending arms having knife-edges at 64, 64 and 65, 65, the former preventing the strips from rocking unduly or twisting out of place in their own plane about the valve-stem, the edges 65, 65 precluding the strips from revolving or turning around the axis of the valve-stem.

Thus the companion and cooperating, bimetal, thermostatic strips are held in proper position and they can expand and contract substantially without hindrance from friction due to the rocking engagement of the strips with one another and due to the knife-edges which afford positioning means with very little friction.

It will be noted, that even after the valve is closed by the spring, the thermostatic bars may contract still further without hindrance or resistance and without danger of a permanent set being imposed in them.

Below the valve 54, passage 39 has a lateral, oil-discharge passage 66 connected to a bent, oil-delivery pipe 67 having a lower open end.

Figures 1, 5:
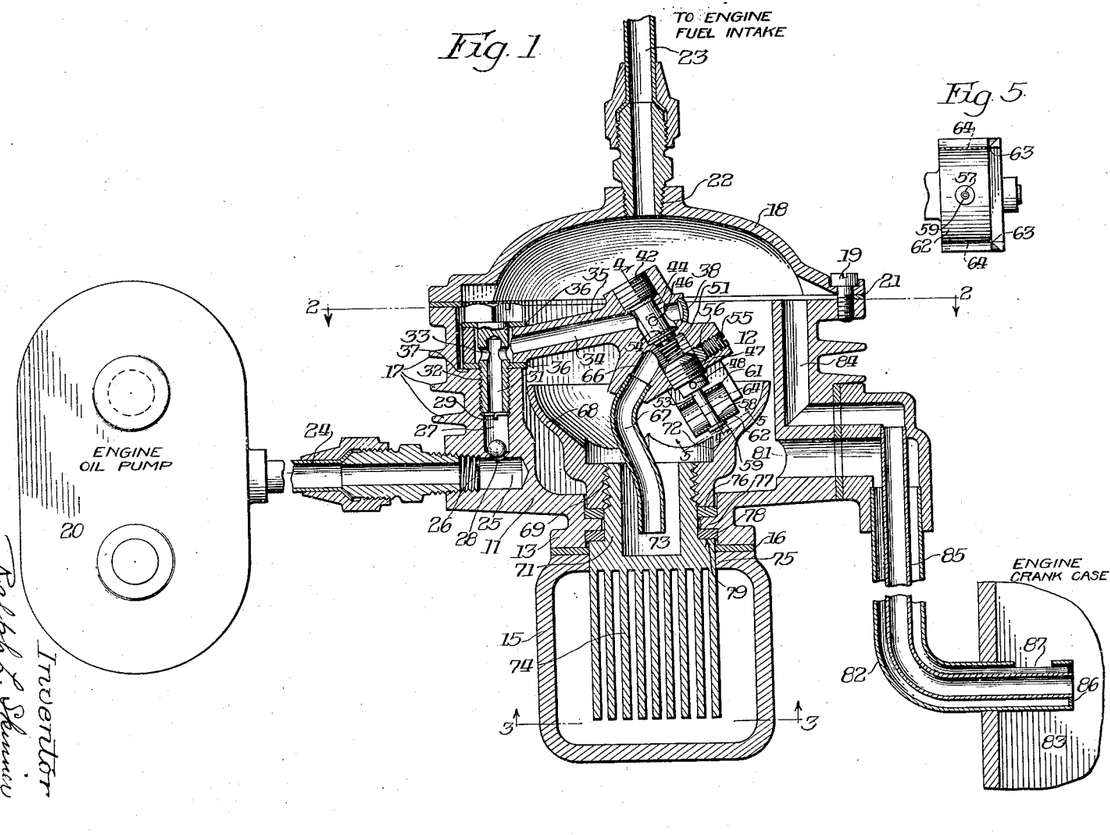
Figure 1 is a central, vertical, cross-section through the oil-rectifier or dilution-eliminator, indicating the oil-pump of the lubricating-system, the exhaust-manifold and a part of the crank-case of the internal-combustion engine.
Figure 5 is a cross-section on line 5—5 of Figure 1.

The depending, multiple thermostat 61, 62 is located in a highly heat-conductive copper vessel 68, a threaded hole 69 through the bottom of which is screwed on to the upper end of a hollow, heating plug 71 of highly-heat-conductive metal, preferably, but not necessarily, of commercially pure copper, the inner wall of the vessel having a hexagonal portion 72 which receives a wrench for the assembly of the two members together.

The upper part of the plug has a recess 73 which, with the interior of the vessel with which it is in direct communication, constitutes an oil container or receptacle which is always full of oil and which overflows over the top edge of the vessel as additional impure oil is permitted to enter such container through the thermostatically-controlled valve hereinabove mentioned.

As will be perceived, the casting 35 and its associated oil-admission valve and thermostat are demountably supported in position, as a unit, and if occasion requires, they may be removed from the structure as one member.

The valve and its valve-seat are above the oil in the receptacle and they are cooled by the incoming oil of relatively low temperature, thus avoiding any danger or possibility of carbon formation at this point.

On the other hand, the thermostat depends into and is constantly immersed in the body of oil, so that its action is always dependent or contingent upon the oil temperature.

Plug or heating-element 71 has a lower, longitudinally-bladed portion, the blades 74 of which project into the exhaust-manifold 15 through an aperture 75 in its top wall, the blades being disposed lengthwise the manifold, or, stated differently, arranged parallel to the direction of travel of the exhaust gases in the manifold.

Such blades are spaced apart a chosen distance such that the exhaust gases will flow between the blades comparatively easily and freely at low engine speeds, but such travel of the gases through such gaps will be materially retarded or restricted during relatively high engine speeds, with the natural result that the blades tend to become quickly and more highly heated when the engine is first started at slow speed, but, at greater speeds, there is a distinct limitation on such heat absorption.

The transmission or conduction of heat from said blades to the oil receptacle is further limited or restricted, after the plug has once become fully heated, by reason of its cross-sectional construction above the blades and also, in some measure, between them, whereby an excessive degree or amount of heat cannot be conveyed to the oil in the container under any extreme operating conditions of the engine.

Such plug is held firmly and securely in position by the oil-vessel 68 which bears on a heat-insulation washer 76 just above an internal rib 77 projecting into the aperture in the bottom wall of the casting 11 through which the plug extends, another heat-insulation washer 78 being used between the under surface of such rib and an annular shoulder 79 on the outer surface of the plug, the latter being of such diameters as to leave spaces between the plug and adjacent faces of the casting 11.

The result is that the casting 11 and the parts which it carries are insulated at all points from the heating-plug and its companion oil-vessel, the latter being spaced inwardly away from such outer casing or housing.

There is, therefore, no direct metallic contact between the exhaust-manifold, the plug and the oil-vessel on the one hand and the outer shell and the elements mounted thereon, on the other hand.

Member 11, below the top edge of and outside of the vessel 68, has a horizontal, oil-outlet passage 81 connected to an outer pipe 82 which delivers the reclaimed or rectified oil overflowing from such vessel back to the engine crank-case 83, the same wall of part 11 having a higher passage 84 opening into the chamber 12 and joined at its other end to a smaller pipe 85 inside of the pipe 82 and connecting with the upper portion of the engine crank-case above its oil supply therein, so that the gases and vapors in such crank-case may be drawn into the rectifier to relieve the vacuum therein, which would otherwise gradually increase sufficiently to prevent the gravity delivery of the reclaimed oil from the rectifier back to the crank-case through pipe 82.

In order to prevent the suction in the rectifier from drawing gases and vapors from the crank-case up through the outer oil-return pipe 82, when the engine is first started, and hence possibly preventing the down flow of oil therethrough, after the reclaimed oil is ready for such delivery, the lower end of such pipe 82 is closed at 86 and an overflow aperture 87 is provided in the pipe at the top, whereby the latter is substantially sealed at such lower part by the small quantity of oil which will always fill that part of the pipe and hence prevent the upward flow of gases and vapors from the crank-case, but which will allow their proper upward passage through the smaller, inner pipe 85 supplied specifically for that purpose.

The novel and improved appliance operates practically as follows:

When permitted to do so, the impure oil to be treated and reclaimed is fed under pressure into the apparatus due to the oil pressure in the inlet-pipe 24 occasioned by the usual oil-pump 20 (illustrated diagrammatically) of the engine lubrication system which obtains its supply of oil from the engine crank-case sump.

Such polluted oil, when flowing into the device, automatically raises the ball check-valve 28, opening its port and permitting such flow, the stop 29 preventing an excessive lift of the valve which might otherwise close the passage through the conduit 31.

The purpose of the check-valve is to prevent siphoning off of the oil contents of vessel 68 and the cavity in the plug when valve 54 is open and the engine is stopped, at the same time ending the operation of the oil-pump.

Such check-valve, therefore, assures that the oil receptacle or container 68—73 will always be filled with oil and hence there is no substantial danger of excessive carbon formation because of the avoidance of the occurrence of a thin film of oil on a hot surface.

When the cold engine is first started, valve 54 will be held closed by the spring 51, because the pair of duplex, thermostatic elements in the oil are in contracted condition, but, as soon as the bladed plug 71 has been heated adequately by the engine exhaust gases and has conducted such heat quickly and efficiently to the upper portion of the plug and to the vessel 68, the temperature of the oil will be raised to the point where it will give off its gasifiable and vaporizable contaminating liquid ingredients, such as fuel and water, under the action of the heat conditions supplemented by the slight vacuum present in the rectifier by reason of the suction exerted through pipe 23.

It will, therefore, be seen that no oil will be admitted into such heating, distillation or evaporation receptacle until its initial oil contents have been properly heated and purified by the vaporization of its objectionable constituents, thus assuring that no oil, not thoroughly rectified, will be returned to the lubrication-system of the engine.

As soon as the oil in the receptacle or container reaches such proper temperature, the thermostat, immersed in such oil and hence subject to its heated condition, automatically opens valve 54, although resisted in such action by the spring 51, and such a small quantity of cold oil is admitted into the lower part of the heating container from which it flows up into the vessel as will reduce the temperature of the oil the small amount required to cause the thermostatic device to contract enough to allow the spring to close the valve.

Such admitted oil causes a corresponding overflow of the purified oil over the top edge of the vessel into the lower part of the chamber 12 from which it flows out through the passage 81 and down pipe 82 by gravity into the oil-supply in the crank-case of the engine, such heated, purified, discharged oil being partly cooled by the crank-case gases and vapors flowing up through the inner-tube 85, which in turn are heated by the oil.

Such preliminarily-heated crank-case vapors and gases, sucked or drawn up into the rectifier by the slight sub-atmospheric pressure condition therein, as will be readily understood, are slowed down enough in their travel through the chamber 12, by reason of its much larger cross-sectional area, to cause the precipitation therefrom of any entrained globules of lubricating oil which will descend either into the heating vessel 68 or will be delivered into the bottom of chamber 12 and be returned with the other oil through the passage 81 to the crank-case.

In the compartment 12, these introduced crank-case gases and vapors mix with those distilled or evaporated off of the hot oil in the receptacle 68—73, and such mixture is consumed economically and advantageously as fuel in the engine, thereby decreasing the fuel consumption of the latter in appreciable degree.

The admission of such crank-case gases and vapors into the chamber 12 performs another desirable and important function, in that they exclude the possibility of the gradual development in said compartment of a subatmospheric condition sufficient to prevent the quick and effective gravity delivery of the heated oil to the crank-case which is at substantially atmospheric pressure.

One reason for partially saitsfying or neutralizing the vacuum condition in the chamber 12 by gases and vapors from the engine crank-case, rather than by air directly from the outside atmosphere, is, that a port or connection of the latter type would tend to become clogged or choked with dust or dirt, thus in time cutting off the return of the oil to the crank-case by permitting the production of an unduly high suction in the chamber, and, in the present appliance, the crank-case is substantially freed from piston blow-by gases and other objectionable vapors with consequent fuel economy in the running of the engine, the crank-case thus being also discharged of water vapors, which, if permitted to remain therein and to condense, would combine with other elements present to form a highly detrimental acid condition tending to corrode and etch metal parts of the engine, such condensation also producing an oil-sludge which, besides other objectionable features, prevents proper operation of the oil-pump in cold weather due to its freezing properties which an oil, maintained free from such condensation, would not have.

Valve 54 opens and closes automatically to keep the oil in the always-filled receptacle 68—73 within a relatively short range of temperature change to insure that all oil passing through the appliance will be raised to suitable rectifying or distilling temperature, but without excessive heating, which might cause undue carbonization, and all of this must be accomplished even though the pressure of the oil in the intake line varies greatly due to the changes of oil consistency, the different speeds of operation of the engine and its oil-pump, and oil leakage through bearing fits due to wear.

Inasmuch as the thermostat of this appliance must permit the spring to close the valve against this greatly varying oil-line pressure and at the same time open the valve against such spring action and keep the oil in the receptacle within a relatively small range of temperature, and, since it is well-known that bimetal thermostats lose a material part of their power if subjected to the degrees of heat essential for the oil to cause the effective distillation of its vaporizable and gasifiable polluting constitutents, it has been found desirable or necessary to devise the new, multiple, compact, substantially-friction-free thermostat which will work satisfactorily under these exacting conditions and which has been illustrated and described above.

This thermostat is so mounted that it is practically free from heat influence of the walls of the vessel in which it is contained and hence may respond or be subject to the temperature condition of the oil only within which it is constantly immersed.

The oil-line pressure may at times exceed seventy-five pounds per square inch, and, at other times, it may be as low as five pounds per square inch, as when the motor is heated and the oil viscosity is reduced, thereby impairing the efficiency of the oil-pump.

Therefore, it is necessary to employ a spring strong enough to close the valve against the maximum oil-line pressure and yet have the device operate satisfactorily under all other conditions.

In order that the thermostat shall control the opening and closing of the valve, due substantially solely to temperature changes of the oil surrounding it, and not be materially modified or influenced in its actions by such great variations in the oil pressure, it is essential that it shall be sensitive to temperature modifications, that it have substantional movement and unusual power for its size, and that it be small to adapt it to successful employment in the relation in which it works.

In an ordinary, duplex-metal, thermostatic bar, the power thereof may be increased by using a bar of greater thickness or one of shorter length, but such change decreases its sensitivity to temperature variations, and the thermostat of this rectifier requires both power and great sensitiveness.

Accordingly, the power of the new thermostat is made great by employing a plurality of short, thin, bimetal strips associated together in series relation to obtain the cumulative effect of the plurality, the short length of the strips affording compactness of structure and power, the thinness insuring a high degree of sensitiveness, and the series relation of the strips multiplying the motion as required.

As the two, curved, thermostatic members become more highly heated, their curvature becomes greater, so that the ends of the inner element 61 move outwardly carrying the outer element 62 with them, and, of course, the corresponding reversed curvature of the latter member also increases with the result that the middle of the outer member is brought to bear against the enlargement 59 through the conjoint series action of the two elements, and, when the force exerted by such multiple thermostat is sufficient to overcome the power of the spring, in which action it is in a measure assisted by the oil pressure on the valve, it opens the valve and lets the cool oil flow through the valve port into the heating receptacle.

When the body of oil cools, the thermostat contracts and allows the spring to close the valve, which remains in this condition until again opened by the thermostat.

It will be noted that even after the valve is fully shut, the thermostat may continue contracting without affecting the valve and without danger of injury to itself, as by putting a permanent set in it.

It is to be borne in mind that the sensitivity of the thermostat to oil temperature changes is paramount and controls its actions regardless of the other variable factors tending to oppose or to accentuate its movements.

Reverting to the heating plug 71, by insulating it and its supported vessel from the exhaust-manifold and from the walls of the outer chamber, the heat collected by the bladed portion of the plug extending into such manifold is conducted directly to the body of oil without being dissipated by conduction into the cooler surrounding walls of the outer compartment, and the latter, being cooler than the inner vessel and its associated plug, cools the purified oil which has overflowed from the vessel in some degree before it is discharged for return to the engine crank-case.

Although the interfitted copper vessel 68 and its plug 71 are so made and related to one another that a rapid, initial heating of the oil will occur to bring it up to proper distilling temperature quickly, yet the cross-sectional area of the copper plug just above its bladed part, or elsewhere, is so designed and chosen as to properly control and limit the maximum degree or amount of heat that will be transmitted to the oil under the most extreme heat conditions of engine operation.

There is a direct operative relation between the heat-conduction limiting structural characteristics of the plug and the functioning of the oil-inlet valve and its related thermostat and spring.

If no such plug constriction or heat-limiting means were employed and the bladed section of the plug were sufficiently large to obtain the necessary, quick, first-stage heating of the oil, when the exhaust-manifold temperatures are relatively low upon starting the engine, then, under present-day high-speed engine operations under open-throttle conditions with the exhaust-gases at about two thousand degrees Fahrenheit, the oil-inlet port, the companion valve and the related thermostat and spring would have to be large enough to admit adequate cooling crank-case oil into the plug and vessel in such substantial amounts as to prevent over-heating of the oil body as a whole, so that the thermostat would have to be of such size and act through such a range of temperature variation that it could not be made small enough and possess such a measure of sensitivity that it could be contained in a receptacle of a size suitable for satisfactory use on commercial, internal-combustion engine automobiles of present construction.

By using the new structure, even though the copper plug projects into exhaust gases of such high temperature, only a predetermined, limited, maximum amount of heat can reach the oil, and, therefore, it is possible to rectify a smaller body of oil, with small admission port to the receptacle, employing a small valve therefor, and a small sensitive thermostat for controlling the valve, one advantage being that by heating such lesser quantity of oil, the usual operating temperatures of the crank-case oil, to which the rectified, purified oil is returned, are not detrimentally increased and the rectifier, functioning as a whole, is more accurately automatically controlled and regulated.

Regarding the bladed portion of the plug, the gaps or spaces between its blades are so chosen that, when the engine is first started, at which time the speed of travel of the exhaust gases is relatively slow, such gases will flow more or less readily between the blades and impart their heat thereto, but as the speed of the engine is increased with resulting faster travel of the exhaust gases, their passage between the blades is somewhat retarded or restricted, due to lack of stream-line effect, and they cannot therefore heat the sides of the blades as effectively as previously, with the result that the plug heats more quickly when the engine operation is first instituted than later when the engine is working at faster speed when added heat is not required.

From the foregoing, it should be apparent that the blade characteristic of the plug, its cross-sectional constriction, the thermostat, and the spring closure of the valve, as well as the heat-insulation mounting of the thermostat and the maintenance of a low temperature of the valve and its port by the incoming cool oil all more or less contribute to the satisfactory and efficient functioning of the appliance as a whole.

Those acquainted with this art will readily understand that the invention is not limited and restricted to the precise and exact details of construction and that many minor mechanical changes may be incorporated in the device without departure from the heart and essence of the invention as defined by the appended claims and without the sacrifice of any of its material or substantial benefits and advantages.

The thermostat per se forms the subject-matter of another patent application.

I claim:

1. The combination of an oil-container, means to admit impure lubricating oil from an internal-combustion engine into said container, a valve controlling said oil-admission, thermostatic means in the oil of said container governing the action of said valve, means to deliver the reclaimed oil from said container, means to remove the vaporized diluents freed from the oil from said container, and a plug of highly heat-conductive material in heat-transmission relation with said container and adapted to extend into the exhaust system of the engine, said plug having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact.

2. The combination of an oil-container, means to feed impure lubricating oil under pressure from an internal-combustion engine into said container, a valve controlling said oil-admission, a spring tending to close said valve, thermostatic means in the oil of said container governing the opening of said valve, means to deliver the reclaimed oil from said container, means to remove the vaporized diluents freed from the oil from said container, and a plug of highly heat-conductive material in heat-transmission relation with said container and adapted to extend into the exhaust-system of the engine, said plug having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact.

3. The combination of an oil-container, means to feed impure lubricating oil under pressure from an internal-combustion engine into said container, a valve controlling said oil-admission, a spring tending to close said valve, a thermostat in the oil of said container governing the opening of said valve, said thermostat comprising a plurality of bi-metal strips acting in series relation, means to deliver the reclaimed oil from said container, means to remove the vaporized diluents freed from the oil from said container, and a plug of highly heat-conductive material in heat-transmission relation with said container and adapted to extend into the exhaust-system of the engine, said plug having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact.

4. The combination of an oil-container, means to feed impure lubricating oil from an internal-combustion engine into said container, means to deliver the reclaimed oil from said container, means to remove the vaporized diluents freed from the oil from said container, and a plug of highly heat-conductive material in heat-transmission relation with said container and having a plurality of blades spaced apart and adapted to extend into the exhaust-system of an internal-combustion engine with the blades substantially parallel to the direction of travel of the hot gases in said system, the spaces between said blades being such as to permit a ready flow of the exhaust-gases therethrough at relatively slow engine speeds and to offer substantially-increased resistance to such flow at comparatively high engine speeds.

5. The combination of an oil-container, means to admit impure lubricating oil from an internal-combustion engine into said container, a valve controlling said oil-admission, thermostatic means in the oil of said container governing the action of said valve, means to deliver the reclaimed oil from said container, means to remove the vaporized diluents freed from the oil from said container, and a plug of highly heat-conductive material in heat-transmission relation with said container and having a plurality of longitudinal spaced blades adapted to extend into the exhaust-system of the engine with the blades substantially parallel to the direction of travel of the hot gases in said system, the spaces between said blades being such as to permit a ready flow of the exhaust gases therethrough at relatively slow engine speeds and to offer substantially-increased resistance to such flow at comparatively high engine speeds.

6. The combination of an oil-container, means to feed impure lubricating-oil from an internal-combustion engine under pressure into said container, a valve controlling said oil-admission, a spring tending to close said valve, thermostatic means in the oil of said container governing the opening of said valve, means to deliver the reclaimed oil from said container, means to remove the vaporized diluents freed from the oil from said container, and a plug of highly heat-conductive material in heat-transmission relation with said container and having a plurality of spaced blades adapted to extend into the exhaust-system of the engine with the blades substantially parallel to the direction of travel of the hot gases in said system, the spaces between said blades being such as to permit a ready flow of the exhaust-gases therethrough at relatively slow engine speeds and to offer substantially-increased resistance to such flow at comparatively high engine speeds.

7. The combination of an oil-container, means to feed impure lubricating-oil from an internal-combustion engine under pressure into said container, a valve controlling said oil-admission, a spring tending to close said valve, thermostatic means in the oil of said container governing the opening of said valve, said thermostatic means comprising a plurality of bi-metal strips acting in series relation, means to deliver the reclaimed oil from said container, means to remove the vaporized diluents freed from the oil from said container, and a plug of highly heat-conductive material in heat-transmission relation with said container and having a plurality of longitudinal spaced blades adapted to extend into the exhaust-system of the engine with the blades arranged substantially parallel to the direction of travel of the hot gases in said system, the spaces between said blades being such as to permit a ready flow of the exhaust-gases therethrough at relatively low engine speeds and to offer substantially-increased resistance to such flow at comparatively high engine speeds.

8. The combination of an oil-container, means to admit impure oil from an internal-combustion engine into said container, means to deliver the reclaimed oil from said container, means to remove the vaporized diluents freed from the oil from said container, and a plug of highly heat-conductive material in heat-transmission relation with said container and having a plurality of spaced blades adapted to extend into the exhaust-system of the engine substantially parallel to the direction of travel of the hot gases in said system, said plug having a cross-sectional constriction permitting a quick initial heating of the plug to the heat-transmission capacity of said constriction and thereafter restricting such heat-transmission to less than that of the heat capable of being absorbed from the exhaust-gases by that part of the plug with which they come into contact.

9. The combination of an oil-container, means to feed impure oil from an internal-combustion engine into said container, means to deliver the reclaimed oil from said container, means to remove the vaporized diluents freed from the oil from said container, and a plug of highly heat-conductive material in heat-transmission relation with said container and having a plurality of longitudinal spaced blades adapted to extend into the exhaust-system of the engine substantially parallel to the direction of travel of the hot gases in said system, the spaces between said blades being such as to permit a ready flow of exhaust gases therethrough at relatively slow engine speeds and to offer substantially-increased resistance to such flow at comparatively high engine speeds, said plug having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact.

10. The combination of a container, means to feed impure lubricating oil from an internal-combustion engine into said container, a valve controlling said oil-admission, thermostatic means in the oil of said container governing the action of said valve, means to deliver the reclaimed oil from said container, means to remove the vaporized diluents freed from the oil from said container, and a plug of highly heat-conductive material in heat-transmission relation with said container and having a plurality of longitudinal spaced blades adapted to extend into the exhaust-system of the engine and in substantially-parallel relation to the travel of the exhaust gases therein, the spaces between said blades being such as to permit a ready flow of the exhaust gases therethrough at relatively slow engine speeds and to offer substantially-increased resistance to such flow at comparatively high engine speeds, said plug having a cross-sectional constriction permitting a quick initial heating of the plug to the heat-transmission capacity of said constriction and thereafter restricting such heat transmission to less than that of the heat capable of being absorbed from the exhaust gases by that part of the plug with which they come into contact.

11. The combination of an oil-container, means to feed impure lubricating oil from an internal-combustion engine under pressure into said container, a valve controlling said oil-admission, a spring tending to close said valve, thermostatic means in the oil of said container governing the opening of said valve, means to deliver the reclaimed oil from said container, means to remove the vaporized diluents freed from the oil from said container, said thermostatic means comprising a multiple thermostat having a plurality of bi-metal strips acting in series relation, and a plug of highly heat-conductive material in heat-transmission relation with said container and having a plurality of longitudinal spaced blades adapted to extend into the exhaust-system of the engine and in substantially-parallel relation to the travel of the hot gases therein, said plug having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact, the spaces between said blades being such as to permit a ready flow of the exhaust gases therethrough at relatively slow engine speeds and to offer substantially increased resistance to such flow at comparatively high engine speeds.

12. The combination of an oil-container, a conduit through which impure oil may be fed under pressure into said container, means to heat the oil in said container, a valve in said conduit, a spring tending to close said valve and of a capacity sufficient to close said valve against the maximum oil pressure in said conduit, a thermostat immersed in said oil and arranged to open said valve upon the occurrence of a predetermined temperature of the oil in said container in opposition to the action of said spring, means to deliver the reclaimed oil from said container, and means to remove the vaporized diluents freed from the fuel from said container.

13. The combination of an oil-container, an impure oil-inlet conduit connected to the interior of said container and adapted to be joined to the pressure lubricating system of an internal-combustion engine, means to heat the oil in said chamber by the hot exhaust gases of said engine, means to permit the delivery of the reclaimed oil from said container, means to remove the vaporized diluents freed from the oil from said container, a valve in said oil-inlet conduit, a spring acting on said valve and of a capacity to close the same against the maximum oil pressure in said conduit, and a thermostat immersed in the oil in said container and of a capacity to open said valve against the closing tendency of the spring upon the occurrence of a predetermined temperature of the oil in said container.

14. The combination of an oil-container, an impure oil-inlet conduit connected to the interior of said container and adapted to be joined to the pressure-lubricating system of an internal-combustion engine, means to heat the oil in said chamber by the hot exhaust gases of said engine, means to permit gravity delivery of the reclaimed oil from said container, means to apply suction to the interior of said container, means to admit air into said container, said suction and said air-admission allowing the specified gravity oil-delivery from said container, a valve in said oil-inlet conduit, a spring acting on said valve and of a capacity to close the same against the maximum oil pressure in said conduit, and a thermostat immersed in the oil in said container and of a capacity to open said valve against the closing tendency of said spring upon the occurrence of a predetermined temperature of the oil in said container.

15. The combination of an oil-container, an impure oil-inlet conduit connected to the interior of said container and adapted to be joined to the pressure lubricating system of an internal-combustion engine, means to heat the oil in said chamber by the hot exhaust gases of said engine, means to permit the delivery of the reclaimed oil from said container, means to remove the vaporized diluents freed from the oil from said container, a valve in said oil-inlet conduit, a spring acting on said valve and of a capacity to close the same against the maximum oil pressure in said conduit, and a thermostat immersed in the oil in said container and of a capacity to open said valve against the closing tendency of said spring upon the occurrence of a predetermined temperature of the oil in said container, said thermostat comprising a plurality of bi-metal strips acting in series relation on said valve.

16. The combination of an oil-container, a conduit extending from below up over said container and delivering thereinto, means to feed impure oil from an internal-combustion engine through said conduit into said container, means to heat the oil in said container by the hot exhaust gases of said engine, means to permit the discharge of the reclaimed oil from said container, means to subject said container to suction, and means to prevent the siphoning off of the contents of said container through said conduit upon cessation of oil feed therethrough.

17. The combination of an oil-container, an impure oil-inlet conduit connected to the interior of said container and adapted to be joined to the pressure lubricating system of an internal-combustion engine, a highly heat-conductive plug adapted to project into the exhaust gases of said engine and in heat-transmission relation with said container, said plug having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact, means to permit the delivery of the reclaimed oil from said container, means to remove the vaporized diluents freed from said oil from said container, a valve in said oil-inlet conduit, a spring acting on said valve and of a capacity to close the same against the maximum oil pressure in said conduit, and a thermostat immersed in the oil in said container and of a capacity to open said valve against the closing tendency of said spring upon the occurrence of a predetermined temperature of the oil in said container.

18. The combination of an oil-container, an impure oil-inlet conduit connected to the interior of said container and adapted to be joined to the pressure lubricating system of an internal-combustion engine, a highly heat-conductive plug having a portion with longitudinal spaced blades adapted to project into the exhaust gases of said engine in substantially parallel relation to the direction of travel of such gases, said plug being in heat-transmission relation with said container and having a cross-sectional constriction permitting a quick initial heating of the plug to the heat-transmission capacity of said constriction and thereafter restricting such transmission to less than that of the heat capable of being absorbed from the exhaust gases by that part of the plug with which they come into contact, the spaces between said blades being such as to permit a ready flow of the exhaust gases therethrough at relatively slow engine speeds and to offer substantially-increased resistance to such flow at comparatively high engine speeds, means to permit the delivery of the reclaimed oil from said container, means to remove the vaporized diluents freed from the oil from said container, a valve in said oil-inlet conduit, a spring acting on said valve and of a capacity to close the same against the maximum oil pressure in said conduit, and a thermostat immersed in the oil in said container and of a capacity to open said valve against the closing tendency of said spring upon the occurrence of a predetermined temperature of the oil in said container.

19. The combination of an oil-container, an impure oil-inlet conduit connected to the interior of said container and adapted to be joined to the pressure lubrication system of an internal combustion engine, a highly heat-conductive plug having a portion with longitudinal spaced blades adapted to project into the exhaust gases of said engine substantially parallel to the direction of travel of such exhaust gases, said plug being in heat-transmission relation with said container and having a cross-sectional constriction permitting a quick initial heating of the plug to the heat-transmission capacity of said constriction and thereafter restricting such heat transmission to less than that of the heat capable of being absorbed from the exhaust gases by that part of the plug with which they come into contact, the spaces between said blades being such as to permit a ready flow of the exhaust gases therethrough at relatively slow engine speeds and to offer substantially-increased resistance to such flow at comparatively high engine speeds, means to permit the delivery of the reclaimed oil from said container, means to remove the vaporized diluents freed from the oil from said container, a valve in said oil-inlet conduit, a spring acting on said valve and of a capacity to close the same against the maximum oil pressure in said conduit, and a thermostat immersed in the oil in said container and of a capacity to open said valve against the closing tendency of said spring upon the occurrence of a predetermined temperature of the oil in said container, said thermostat comprising a plurality of bi-metal strips acting in series relation on said valve.

20. The combination of an oil-container, an impure oil-inlet conduit connected to the interior of said container and adapted to be joined to the pressure lubrication system of an internal-combustion engine, means to heat the oil in said chamber by the hot exhaust gases of the engine, means to permit the delivery of the reclaimed oil from said container, means to remove the vaporized diluents freed from the oil from said container, a valve governing the inflow of oil through said conduit, a spring acting on said valve tending to close the same and of a capacity to close the valve against the maximum oil pressure in said conduit, and a thermostat immersed in the oil in said container acting to open said valve against the closing tendency of said spring upon the occurrence of a predetermined oil temperature, said thermostat having a loose connection with said valve permitting further contraction thereof after the closing of the valve without strain on the thermostat.

21. The combination of an oil-container, an impure oil-inlet conduit connected to the interior of said container and adapted to be joined to the pressure lubrication system of an internal-combustion engine, a highly heat-conductive plug having a portion with longitudinal spaced blades adapted to project into the exhaust gases of said engine in substantially parallel relation to the direction of travel of said gases, said plug being in heat-transmission relation with said container and having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact, the spaces between the blades being such as to permit a ready flow of the exhaust gases therethrough at relatively slow engine speeds and to offer substantially-increased resistance to such flow at comparatively high engine speeds, means to permit the delivery of the reclaimed oil from said container, means to remove the vaporized diluents freed from the oil from said container, a valve governing the inflow of oil through said conduit, a spring acting on said valve tending to close the same and of a capacity to close the valve against the maximum oil pressure in said conduit, and a thermostat immersed in the oil in said container acting to open said valve against the closing tendency of said spring upon the occurrence of a predetermined oil temperature, said thermostat comprising a plurality of bi-metal strips acting in series relation on the valve and having a loose connection with said valve permitting further contraction of the thermostat after the closing of the valve without strain on the thermostat.

22. The combination of an oil-container, an impure oil-inlet conduit connected to the interior of said container and adapted to be joined to the pressure lubricating system of an internal-combustion engine, a highly heat-conductive plug having a portion with longitudinal spaced blades adapted to project into the exhaust gases of said engine substantially parallel to the direction of travel of said gases, said plug being in heat-transmission relation with said container and having a cross-sectional constriction permitting a quick initial heating of the plug to the heat-transmission capacity of said constriction and thereafter restricting such heat-transmission to less than that of the heat capable of being absorbed from the exhaust gases by that part of the plug with which they come into contact, the spaces between said blades being such as to permit a ready flow of the exhaust gases therethrough at relatively slow engine speeds and to offer substantially-increased resistance to such flow at comparatively high engine speeds, means to permit the gravity delivery of the reclaimed oil from said container to the engine crankcase, means to apply suction derived from the fuel-inlet system of the engine to said container to remove the vaporized diluents freed from the oil, means to admit the gases and vapors from the engine crank-case into said container, said suction and said gas and vapor admission permitting the specified gravity delivery of oil, a valve governing the inflow of oil through said conduit, a spring acting on said valve tending to close the same and of a capacity to close the valve against the maximum oil pressure in said conduit, and a thermostat immersed in the oil in said container acting to open said valve against the closing tendency of said spring upon the occurrence of a predetermined oil temperature, said thermostat comprising a plurality of bi-metal strips acting in series relation on said valve, said thermostat having a loose connection with said valve permitting further contraction thereof after the closing of said valve without strain on the thermostat.

23. The combination of an oil-container, an impure oil-inlet conduit connected to the interior of said container and adapted to be joined to the pressure lubricating system of an internal-combustion engine, means to heat the oil in said chamber by the hot exhaust gases of the engine, means to permit the delivery of the reclaimed oil from said container, means to remove the vaporized constituents freed from the oil from said container, a valve governing the inflow of oil through said conduit, means acting on said valve tending to close the same and of a capacity to close the valve against the maximum oil pressure in said conduit, and a thermostat immersed in the oil in said container and acting to open said valve against the closing tendency of said means upon the occurrence of a predetermined oil temperature.

24. The combination of an oil-container, an impure oil-inlet conduit connected to the interior of said container and adapted to be joined to the pressure lubricating system of an interal-combustion engine, means to heat the oil in said chamber by the hot exhaust gases of the engine, means to permit the delivery of the reclaimed oil from said container, means to remove the vaporized diluents freed from the oil from said container, a valve governing the inflow of oil through said conduit, means acting on said valve tending to close the same and of a capacity to close the valve against the maximum oil pressure in said conduit, and a thermostat supported from above and depending into the oil in said container and acting to open said valve against the closing tendency of said means upon the occurrence of a predetermined oil temperature.

25. The combination of an oil-container, an impure oil-inlet conduit connected to the interior of said container and adapted to be joined to the pressure lubricating system of an internal-combustion engine, means to heat the oil in said chamber by the hot exhaust gases of the engine, means to permit the delivery of the reclaimed oil from said container, means to remove the vaporized diluents freed from the oil from said container, a valve governing the inflow of oil through said conduit, means acting on said valve tending to close the same and of a capacity to close the valve against the maximum oil pressure in said conduit, and a thermostat supported from above and depending into the oil in said container and acting to open said valve against the closing tendency of said means upon the occurrence of a predetermined oil temperature, said thermostat having a loose connection with said valve permitting further contraction thereof after the closing of said valve.

26. The combination of an oil-container, an impure oil inlet conduit connected to the interior of said container and adapted to be joined to the pressure lubricating system of an internal-combustion engine, means to heat the oil in said container by the hot exhaust gases of the engine, means to permit the delivery of the reclaimed oil from said container, means to remove the vaporized diluents freed from the oil from said container, a valve governing the inflow of oil through said conduit, means acting on said valve tending to close the same and of a capacity to close the valve against a pressure substantially greater than the maximum oil pressure in said conduit, and a thermostat immersed in the oil in said container acting to open the valve against the closing tendency of said means upon the occurrence of a predetermined oil temperature.

27. The combination of an oil-container, an impure oil-inlet conduit adapted to be joined to the pressure lubricating system of an internal-combustion engine and arranged to deliver its oil into the lower portion of said container, heat-conductive means in heat-transmission relation with the lower portion of said container and adapted to be heated by the hot exhaust gases of the engine, means to permit the delivery of the reclaimed oil from said container, means to remove the vaporized diluents freed from the oil, a valve governing the inflow of oil through said conduit, a spring acting on said valve tending to close the same and of a capacity to close the valve against the maximum oil pressure in said conduit, and a thermostat immersed in the oil in said container acting to open the valve against the closing tendency of said spring upon the occurrence of a predetermined oil temperature.

28. The combination of a heat-conductive plug adapted to be mounted on the exhaust system of an internal-combustion engine and to project into the hot exhaust gases thereof and having a cavity, an oil-vessel mounted on and in communication with the cavity of said plug, the two forming an oil-receptacle, in combination with means to admit impure oil into said receptacle, means to permit the discharge of the reclaimed oil, and means to remove the vaporized diluents freed from the oil in said receptacle.

29. In an oil-rectifiying system, the combination of an oil-container, means to admit impure lubricating oil from an internal-combustion engine into said container, means to heat said container by the exhaust gases of the engine, a valve governing said oil admission, means tending to close said valve and of a capacity to close the valve against the maximum oil pressure thereon, thermostatic means immersed in the oil of said container governing the action of said valve, means to deliver the reclaimed oil from said container, and means to remove the vaporized diluents freed from the oil from said container, the admission of oil into said container and the delivery of oil therefrom always being practically equal and substantially simultaneous, whereby said container constantly holds a substantially unvarying quantity of oil in which the thermostatic means is constantly immersed.

In witness whereof I have hereunto set my hand.

RALPH L. SKINNER.